UNITED STATES PATENT OFFICE 2,258,260

WATER TREATMENT

Cyrus W. Rice, Pittsburgh, Pa.

No Drawing. Application December 31, 1937,
Serial No. 182,809

6 Claims. (Cl. 210—23)

This invention relates to a water treatment, adapted particularly to the treatment of water which is heated in steam-generating boilers or lower temperature heaters. The general purpose of my invention is to provide a method of water treatment capable of inhibiting both scale and/or adherent sludge formations in boilers or heaters.

Various methods of inhibiting formations in boilers and heaters which result through depositions of salts that are insoluble under the conditions existing in most heating instrumentalities, have been proposed and employed. The preponderant scale-forming elements present in all waters are calcium and magnesium, which tend under boiler conditions to form insoluble precipitates having the quality of encrusting the surfaces upon which they are deposited. Silica, on the other hand, while present in proportionally much smaller quantities in most water supplies, proves by far the most troublesome water constituent because of its quality of forming dense and adherent encrustations, and the property it possesses of cementing chemical precipitates or sludges into hard masses; all of which influences have a direct bearing on boiler repairs and cleaning costs.

My invention relates to a type of treatment in which all the inorganic scale-forming and cementing constituents in a water actually react chemically with certain proteins in the formation of salt-like crystalloids, which remain in intimate suspension in the water in its passage through the water-heating and feeding equipment of a boiler, and within the circulating waters within boilers themselves, until the crystalloid bodies are removed to waste through means provided for the purpose.

The present practices in use for conditioning boiler feed waters with commercial chemicals, under the best sorts of treatment control, result in more or less deposition of objectionable sludge materials within water carrying and heating equipment, and boilers.

Supplemental treatments employing starches are beneficial in this connection, but have proven uncertain in their effects. This is largely because they function mechanically in preventing hard sludge formation, and because of the destructive action soda concentrations and temperature within boilers have on the starches.

By following the procedure of my invention, the intimate chemical reaction between reacted proteins of the kind employed and scale-forming and cementing constituents in waters, with resultant formation of amorphous crystalloid compounds, provides greater protection against hard scale and sludge formations than it is possible to obtain by the mechanical effects of starch, or similar colloid producing materials, or by any straight treatment with inorganic chemicals.

The proteins which I employ react chemically with all of calcium, magnesium and silica in the formation of calcium, magnesium, and silica, protein compounds.

Being crystalloid, the bodies formed by reaction of each of the scale-forming ingredients with the protein compounds has a specific solubility in water, and the lesser water solubility of calcium, magnesium and silica causes these reaction products to be precipitated as colloids with high dispersion value. This gives a control in the conditioning of feed waters that definitely eliminates the possibility of troublesome scale and sludge formations within water heating instrumentalities and in the connections thereto, and permits the scale-inhibiting material to be introduced satisfactorily in the feed water which passes to a boiler. It thus has a general advantage over purely inorganic materials, in that its crystalloid nature, and the crystalloid nature of its reaction products, accommodates it to the free circulation of water in which it is included.

Briefly to indicate my invention, I have discovered that suitably reacted proteins are capable of maintaining in a body of water a reactive and adsorptive colloidal dispersion, and that by reaction with calcium and magnesium, (also with iron and other metals) such colloidal reagents do not lose their crystalloid character. On the contrary, the compounds which are formed by reaction of the substances commonly found in boiler water with a protein compound such as I employ are crystalloid and not scale-forming. They are effectively eliminated to waste by boiler blow-downs, or other modes in which freely suspended matter may be removed from a containing vessel.

In my prior patent, No. 2,085,828, dated July 6, 1937, I have disclosed the use in the water of boilers and the like of a colloid consisting of the reaction products of phosphoric acid with starches, such for example as tapioca starch, soya bean starch, and the like, which are reactive with the phosphoric acid. I have now discovered that by reaction of phosphoric acid, or lactic acid, with suitable proteins, such as casein, glycinin (derived from soya beans) and the protein of cottonseeds, representative of the globulins with phosphoric and lactic acids, I obtain a colloid-producing material which is both mechanically and chemically effective in inhibiting in heated water the scale-forming tendencies of calcium, magnesium and silica. This material presents, over the colloid-producing products obtained by the use of phosphoric acid with starch, the advantage that it reacts chemically with calcium and magnesium and silica, and does not function merely mechanically in preventing hard sludge formations. It has the additional advantage that it may wholly replace inorganic chemical treatments, in that a water solution of it remains as a stable colloid solution when boiled. My product may, without loss of effectiveness, be stored for an indefinite length of time before use; and being of a concentrated nature, a quantity sufficient for the treatment of water throughout extended periods of time may, without difficulty, be kept on hand in the locality of its use.

I have recognized that the types of proteins exemplified by casein, glycinin and cottonseed protein are remarkably alike, being almost identical in their carbon, hydrogen, oxygen, nitrogen, sulphur and phosphorous content. They are all amphoteric, and acquire the ability to form highly stable colloidal solutions when suitably reacted. Phosphoric acid, from among the mineral acids, reacts to form a suitable gel with casein, glycinin, and cottonseed proteins. I have also reacted casein, glycinin and cottonseed protein, and other less readily available proteins of their types, with lactic acid, to form gels suitable for my purpose.

In effecting such reactions, care should be taken that the reaction conditions be controlled. This is in order to avoid decomposition into amino acids, which I have found to be far less effective for the purpose of water treatment than the salt-like gels which are the intended reaction products.

The following examples will illustrate suitable reactions producing the colloidal material which I use in water treatment:

Example No. 1

| | Parts by weight |
|---|---|
| Commercial orthophosphoric acid (70% $H_3PO_4$) | 70 |
| Glycinin | 30 |

These materials are mixed together with agitation to produce a glycinin phosphate, which is a gelled product of the reaction. The reaction may be formed at room temperature, without the application of heat.

In effecting a straight reaction of a protein, between glycinin and orthophosphoric acid of the given $H_3PO_4$ value, the protein reacted should not be substantially less than 25% by weight of the reaction mixture, as the water content of orthophosphoric acid tends to break down the glycinin into amino acids, which are much less desirable for water conditioning purposes. The 70% $H_3PO_4$ value of the orthophosphoric acid is given as exemplary because that is the approximate value of a usual and desirable commercial acid. It is therefore the water content of the orthophosphoric acid which determines the proportion of protein which it is necessary to react with the phosphoric acid, greater $H_3PO_4$ value of the acid requiring a lower proportion of a protein, and vice versa.

In the use of lactic acid in the production of my water conditioning agent with glycinin I find that almost any concentration of the acid may be employed without apportioning the percentage of the protein, as for example:

Example No. 2

| | Parts by weight |
|---|---|
| 85% lactic acid | 56 |
| Glycinin | 44 | is as effective in this conversion to the desired colloid as is a mixture of

| | Parts by weight |
|---|---|
| 22% lactic acid | 70 |
| Glycinin | 30 |

Desirable mixtures of metallic substances, such as zinc and aluminum, have been made between glycinin and/or lactic and phosphoric acids with equal effect in producing amorphous crystalloid compounds.

Examples of such mixtures are as follows:

Example No. 3

| | Parts by weight |
|---|---|
| Commercial orthophosphoric acid (70% $H_3PO_4$) | 70 |
| Glycinin | 25 |
| Finely divided metallic zinc | 5 |

The reaction product is gelled to a solid, and consists of zinc acid glycinate, or glycinin acid zinc phosphate.

Example No. 4

| | Parts by weight |
|---|---|
| Commercial lactic acid (85% concentration) | 56 |
| Glycinin | 40 |
| Finely divided metallic zinc | 4 |

These materials also are mixed together at normal room temperature with agitation, and the reaction product is gelled zinc acid glycinate, or glycinin acid zinc lactate.

All these products possess the same general properties as glycinin lactate or glycinin phosphate. The proportions mentioned give a product of a spongy dry resilient nature, which may be commercially distributed.

It will be understood that, as a general principle, the less the $H_3PO_4$ value of the phosphoric acid used for the reaction the greater should be the proportion of protein reacted; this in order to avoid decomposition into amino acids. This problem does not exist in the case of lactic acid.

When the colloidal reaction product is in the solid state described, it is desirably reacted with a suitable alkaline reagent such as a compound of sodium potassium or ammonium in water solution, prior to its introduction into water in, or passing to, a boiler or lower temperature water heater. The resultant product, such as sodium glycinin phosphate, or sodium zinc glycinin phosphate, (like the simple reaction products of proteins with phosphoric acid or lactic acid) forms in the water a true colloidal solution and is, therefore, capable of being passed through the water connections without exhibiting any tendency to ball up, and clog valves or orifices through which the water may be passed.

In the boiler, or water heater, the colloid solution reacts with the scale-forming radicals in the water to produce a variety of crystalloid compounds such as calcium glycinate, magnesium glycinate, calcium-magnesium glycinate, calcium-glycinin phosphate, magnesium-glycinin phosphate, calcium-magnesium glycinin phosphate, glycinin-zinc silicate, glycinin silicate, calcium-glycinin zincate, calcium-magnesium glycinin zincate. Glycinin lactate possesses the same reaction properties as the glycinin phosphate in that it precipitates calcium, magnesium and silica in this same colloidal form. This variety of compounds is possible because the treating colloid is amphoteric, and because the glycinin, or its equivalent, is reactive with silica as well as with calcium and magnesium; and because the zinc, or its equivalent, is also reactive with calcium, magnesium and silica. None of the products of the colloidal reaction are capable of a cemented deposition to form hard sludge masses in either feed water heating and feeding equipment, or in boilers. On the contrary, they are themselves crystalloid, and tend on agglomeration to remain in suspension in the water, or are precipitated in the form of a soft sludge which may readily be removed from a boiler by blowing down to waste.

I have found that zinc, or its equivalent aluminum, performs a variety of functions; as for example, in the initial gel-forming reaction it acts as a retarding ingredient, reducing the activity of orthophosphoric acid in breaking down the glycinin to components of the amino-acid group.

If, in reacting to form the water treating compound the proportions be varied from these given above so that the proportion of acid to protein is carefully increased, the product is a heavy liquid colloid, rather than a solid rubber-like mass. This is particularly true if zinc or aluminum is not included in the reaction mixture. If, however, the proportion of acid with respect to protein is not excessive, the product (assuming that lactic acid be used) is nonetheless fundamentally a gel, capable of forming with water a colloidal solution, or fine colloidal dispersion stable under boiler conditions and capable of effecting the desired reactions in a boiler or water heater. It is desirable to produce a treating compound in solid form, because it may in that form be conveniently shipped and stored. It is desirable, as above noted, to react the compound with alkalinity due to sodium, potassium, and/or ammonium, before introducing it into the boiler water, unless there be present in the boiler water a substantial alkaline concentration. This is in order to avoid corrosion in the boiler.

While the examples including zinc and aluminum have described the reaction of these metals in their metallic state, they may be included in the reaction mixture in the form of their salts or bases, such as aluminum chloride, zinc chloride, aluminum hydroxide and zinc hydroxide. It should be borne in mind that without the addition of these metals the treating compound in its simpler form, such as glycinin phosphate, or glycinin lactate, is capable of reacting with silica, calcium and magnesium, to inhibit the deposition of these materials within the feed water heating and feeding equipment, and boilers.

It should be borne in mind that a great advantage resides in the type of product produced by reaction of any variant of my treating compounds with such radicals as calcium, magnesium, silica, iron, and the like, in the boiler water, because the products are all of a nature to remain suspended in the water, and are, therefore, readily removed by blowdowns to waste. This results in reduced carryovers and better steam qualities.

I find that the reaction of glycinin with lactic acid produces the most favorable material for water treating purposes. It is not my intent to limit my invention to the use of lactic and/or phosphoric acid with glycinin, casein, or cottonseed protein. Useful results are obtained by reacting any protein having the approximate composition common to the proteins specifically noted with one, or a mixture of these acids.

I claim as my invention:

1. The herein described method of inhibiting in a vessel containing heated water scale formation due preponderantly to calcium and magnesium compounds in the water which consists in reacting the calcium and magnesium compounds of the water in substantial entirety with a colloid dispersion of a protein substance selected from the globulins reactive with calcium and magnesium, and prepared for reaction with the calcium and magnesium compounds with at least one acid capable of peptizing reaction with a protein without disintegration of the protein into amino products, and further reacted with a water-soluble alkaline reagent.

2. The herein described method of water treatment in accordance with the definition of claim 1, in which the colloidal water treating material is the product of reaction of a protein selected from the globulins with orthophosphoric acid.

3. The herein described method of water treatment in accordance with the definition of claim 1, in which the colloidal water treating material is the product of reaction of a protein selected from the globulins with lactic acid.

4. The herein described method of inhibiting in a vessel containing heated water scale formation due preponderantly to calcium and magnesium compounds in the water which consists in reacting the calcium and magnesium compounds of the water in substantial entirety with a colloid dispersion of a protein substance selected from the globulins reactive with calcium and magnesium, and prepared for reaction with the calcium and magnesium compounds with at least one acid capable of peptizing reaction with a protein without disintegration of the protein into amino products in the presence of an amphoteric metal selected from zinc and aluminum, and further reacted with a water-soluble alkaline reagent.

5. The herein described method of inhibiting scale formation in a vessel containing heated water which consists in maintaining in the water in a proportion adequate in substantial entirety to react with calcium and magnesium compounds therein a colloidal alkaline dispersion of a preformed reaction product of a protein selected from the globulins reactive with calcium and magnesium reacted with an acid selected from the phosphoric and lactic acids and with an amphoteric metal selected from zinc and aluminum.

6. The herein described method of inhibiting in a vessel containing heated water scale formation due preponderantly to calcium and magnesium compounds in the water which consists in reacting the calcium and magnesium compounds of the water in substantial entirety with a colloid dispersion of a protein substance selected from the globulins reactive with calcium and magnesium, and prepared for reaction with the calcium and magnesium compounds with an acid selected from the phosphoric and lactic acids and with an amphoteric metal selected from zinc and aluminum.

CYRUS WM. RICE.